United States Patent
Kodama et al.

(10) Patent No.: US 10,898,967 B2
(45) Date of Patent: Jan. 26, 2021

(54) CONSUMABLE ELECTRODE TYPE GAS SHIELD ARC WELDING METHOD AND ARC WELDING PORTION

(71) Applicant: NIPPON STEEL & SUMITOMO METAL CORPORATION, Tokyo (JP)

(72) Inventors: Shinji Kodama, Tokyo (JP); Tasuku Zeniya, Tokyo (JP); Shoko Oami, Tokyo (JP); Masahiro Matsuba, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 268 days.

(21) Appl. No.: 16/065,069

(22) PCT Filed: Jan. 20, 2017

(86) PCT No.: PCT/JP2017/001934
§ 371 (c)(1),
(2) Date: Jun. 21, 2018

(87) PCT Pub. No.: WO2017/126657
PCT Pub. Date: Jul. 27, 2017

(65) Prior Publication Data
US 2018/0369945 A1    Dec. 27, 2018

(30) Foreign Application Priority Data
Jan. 20, 2016    (JP) .................................. 2016-008695

(51) Int. Cl.
B23K 9/16    (2006.01)
B23K 9/173    (2006.01)
(Continued)

(52) U.S. Cl.
CPC ................ B23K 9/173 (2013.01); B23K 9/16 (2013.01); B23K 9/295 (2013.01); B23K 9/325 (2013.01);
(Continued)

(58) Field of Classification Search
CPC ......... B23K 9/173; B23K 35/383; B23K 9/23
See application file for complete search history.

(56) References Cited

U.S. PATENT DOCUMENTS 4,161,645 A * 7/1979 Shimada ................. B23K 9/167
219/137 R
4,680,440 A * 7/1987 Barlet .................... B23K 9/291
219/137 R
(Continued)

FOREIGN PATENT DOCUMENTS

JP    64-27170 U    2/1989
JP    7-36958 B2    4/1995
(Continued)

OTHER PUBLICATIONS

Russian Office Action and Search Report, dated Apr. 18, 2019, for Russian Application No. 2018122455, with an English translation.
(Continued)

Primary Examiner — Dana Ross
Assistant Examiner — Lawrence H Samuels
(74) Attorney, Agent, or Firm — Birch, Stewart, Kolasch & Birch, LLP

(57) ABSTRACT

The present invention provides a consumable electrode type gas shield arc welding method for performing arc welding of two steel sheets using a welding torch having a consumable electrode. The consumable electrode type gas shield arc welding method includes performing arc welding while a shielding gas having an oxygen potential α which is indicated by the following Expression (1) and ranges from 1.5%
(Continued)

to 5% is supplied from the welding torch toward the consumable electrode, and blowing an oxidation promotion gas having an oxygen potential β which is indicated by the following Expression (2) and ranges from 15% to 50% at a flow velocity ranging from 1 to 3 m/sec over a weld bead and a weld toe portion which are formed by arc welding and are in a state of 700° C. or higher, $$\alpha = 100 \times ([V_1(O_2)] + [V_1(CO_2)]/5)/([V_1(X)] + [V_1(O_2)] + [V_1(CO_2)]) \quad \text{Expression (1)}$$

$$\beta = 100 \times [V_2(O_2)]/([V_2(X)] + [V_2(O_2)] + [V_2(CO_2)]) \quad \text{Expression (2)}$$

here, $[V_1(X)]$ is a mixing ratio (volume %) of an inert gas included in the shielding gas, $[V_1(O_2)]$ is a mixing ratio (volume %) of oxygen included in the shielding gas, $[V_1(CO_2)]$ is a mixing ratio (volume %) of carbon dioxide included in the shielding gas, $[V_2(X)]$ is a mixing ratio (volume %) of an inert gas included in the oxidation promotion gas, $[V_2(O_2)]$ is a mixing ratio (volume %) of oxygen included in the oxidation promotion gas, and $[V_2(CO_2)]$ is a mixing ratio (volume %) of carbon dioxide included in the oxidation promotion gas.

7 Claims, 8 Drawing Sheets

(51) Int. Cl.
  *B23K 35/38* (2006.01)
  *B23K 9/29* (2006.01)
  *B23K 9/32* (2006.01)
  *B23K 35/22* (2006.01)
  *B23K 35/30* (2006.01)
  *B23K 103/04* (2006.01)
  *B23K 9/23* (2006.01)

(52) U.S. Cl.
  CPC ........ *B23K 35/226* (2013.01); *B23K 35/3073* (2013.01); *B23K 35/383* (2013.01); *B23K 9/23* (2013.01); *B23K 2103/04* (2018.08)

(56) References Cited

U.S. PATENT DOCUMENTS

| | | | | |
|---|---|---|---|---|
| 5,124,527 | A * | 6/1992 | Takano | B23K 9/164 219/137.2 |
| 7,915,560 | B2 * | 3/2011 | Satou | C23C 8/10 219/74 |
| 2006/0275623 | A1 * | 12/2006 | Takeda | B32B 15/012 428/653 |
| 2008/0296269 | A1 * | 12/2008 | Sato | B23K 9/167 219/121.46 |
| 2009/0107970 | A1 * | 4/2009 | Norrish | B23K 9/325 219/137 R |
| 2013/0299463 | A1 * | 11/2013 | Kanemaru | B23K 9/173 219/74 |
| 2014/0021174 | A1 * | 1/2014 | Miyasaka | B23K 9/123 219/121.45 |
| 2015/0001185 | A1 * | 1/2015 | Kanemaru | B23K 9/167 219/75 |
| 2015/0027993 | A1 * | 1/2015 | Bruck | B23K 35/327 219/73.2 |
| 2016/0201184 | A1 * | 7/2016 | Seghi | B23K 26/123 148/224 |

FOREIGN PATENT DOCUMENTS

| | | |
|---|---|---|
| JP | 8-33997 A | 2/1996 |
| JP | 2007-44736 A | 2/2007 |
| JP | 2007-144427 A | 6/2007 |
| JP | 4327153 B2 | 9/2009 |
| JP | 2012-213801 A | 11/2012 |
| KR | 10-1993-0009373 B1 | 10/1993 |
| KR | 10-2005-0095744 A | 9/2005 |
| RU | 2319584 C1 | 3/2008 |
| SU | 996134 A | 2/1983 |
| SU | 1412901 A1 | 7/1988 |

OTHER PUBLICATIONS

International Search Report for PCT/JP2017/001934 (PCT/ISA/210) dated Feb. 28, 2017.
Written Opinion of the International Searching Authority for PCT/JP2017/001934 (PCT/ISA/237) dated Feb. 28, 2017.
Korean Notice of Allowance dated Nov. 6, 2019, for Counterpart Korean Application No. 10-2018-7017174, with English translation.

* cited by examiner

CONSUMABLE ELECTRODE TYPE GAS SHIELD ARC WELDING METHOD AND ARC WELDING PORTION

TECHNICAL FIELD OF THE INVENTION

The present invention relates to a consumable electrode type gas shield arc welding method and an arc welding portion which is able to be acquired through the consumable electrode type gas shield arc welding method.

Priority is claimed on Japanese Patent Application No. 2016-008695, filed on Jan. 20, 2016, the content of which is incorporated herein by reference.

RELATED ART

Gas shield arc welding is widely used in various fields. For example, in the automobile field, gas shield arc welding is used for welding suspension members and the like.

As a shielding gas when a steel member is subjected to gas shield arc welding using a solid wire, a gas of 100% $CO_2$ or a mixed gas of Ar and $CO_2$ is used. However, if welding is performed by using a shielding gas including an oxidized gas such as $CO_2$, oxygen included in the oxidized gas in the shielding gas reacts to an element such as Si or Mn included in a steel or a wire, thereby generating a Si/Mn-based slag having a Si oxide or a Mn oxide as a main constituent. As a result, plenty of Si/Mn-based slag remains on a surface of a weld bead which is a melting solidification portion.

Members requiring corrosion resistance, such as suspension members for automobiles, are subjected to electrodeposition coating after welding assembling. When this electrodeposition coating is performed, if a Si/Mn-based slag remains on a surface of an arc welding portion, electrodeposition coating characteristics of that portion deteriorate. As a result, coating is not applied and locations of a Si/Mn-based slag appearing on the surface are generated, so that corrosion resistance is degraded (refer to FIG. 8).

The reason why the electrodeposition coating characteristics are degraded in a portion in which a Si/Mn-based slag remains is that a Si oxide or a Mn oxide is an insulation body. The insulation body blocks energization at the time of coating, so that coating does not adhere to the entire surface.

The Si/Mn-based slag is a by-product of a deoxidation process for a welding portion and has an effect stabilizing an arc itself. Therefore, in gas shield arc welding using a solid wire or the like, it is difficult to prevent the Si/Mn-based slag from being generated. As a result, corrosion of a welding portion has been unavoidable even in a member subjected to electrodeposition coating.

Accordingly, in design of suspension members and the like for automobiles, the sheet thickness thereof is designed to be thicker in consideration of thickness reduction caused due to corrosion, which has become an obstacle to thinning realized by using a high tensile strength steel.

In the related art, with regard to such a problem, countermeasures have been proposed as follows in order to reduce the amount of a Si/Mn-based slag generated in gas shield arc welding and to ameliorate electrodeposition coating characteristics.

For example, Patent Document 1 proposes a method in which the amount of a slag (oxide) is reduced by limiting the amount of an oxidized gas ($CO_2$, $O_2$) in a shielding gas which is a supply source of oxygen.

Patent Document 2 proposes a consumable electrode type gas shield arc welding method in which a shielding gas including an inert gas is supplied to a consumable electrode and an added gas including a mixed gas of an oxidized gas and an inert gas is supplied to an outer edge of a molten pool. According to this welding method, the concentration of oxygen dissolved in a weld metal can be controlled to be extremely low while an arc is stabilized.

Patent Document 3 proposes a gas shield metal arc welding method of using a welding wire having a component composition in which the total amount of Si in a base metal and the welding wire is limited to a range from 0.04% to 0.2%.

PRIOR ART DOCUMENT

Patent Document

[Patent Document 1] Japanese Unexamined Patent Application, First Publication No. 2012-213801

[Patent Document 2] Japanese Unexamined Patent Application, First Publication No. 2007-044736

[Patent Document 3] Japanese Unexamined Patent Application, First Publication No. H8-33997

DISCLOSURE OF THE INVENTION

Problems to be Solved by the Invention

However, the technologies of Patent Documents 1 to 3 are not sufficient from a viewpoint of becoming free from the amount of a generated insulating slag. Particularly, in a high tensile strength steel sheet containing a large amount of Si or Mn, there is a problem that plenty of Si/Mn-based slag are generated due to Si or Mn included in a base metal. In addition, if the amount of $CO_2$ or $O_2$ in a shielding gas is reduced as in Patent Document 1, the ratio of Ar increases, so that cost rises and an arc wobbles at the time of welding, thereby leading to a problem of deterioration of a bead shape. In addition, if the amount of a deoxidizing element is small as in Patent Document 3, deoxidation of a weld metal is not sufficient, thereby leading to a problem that a blowhole is likely to be generated.

Therefore, an object of the present invention is to provide a consumable electrode type gas shield arc welding method able to form a welding portion in which no poor electrodeposition coating portion is generated due to a Si/Mn-based slag, and an arc welding portion.

Means for Solving the Problem

The gist of the present invention is as follows.

(1) According to a first aspect of the present invention, there is provided a consumable electrode type gas shield arc welding method for performing arc welding of two steel sheets using a welding torch having a consumable electrode. The consumable electrode type gas shield arc welding method includes performing arc welding while a shielding gas having an oxygen potential α which is indicated by the following Expression (A) and ranges from 1.5% to 5% is supplied from the welding torch toward the consumable electrode, and blowing an oxidation promotion gas having an oxygen potential β which is indicated by the following Expression (B) and ranges from 15% to 50% at a flow velocity ranging from 1 to 3 m/sec over a weld bead and a weld toe portion which are formed by arc welding and are in a state of 700° C. or higher, $$\alpha=100\times([V_1(O_2)]+[V_1(CO_2)]/5)/([V_1(X)]+[V_1(O_2)]+[V_1(CO_2)]) \quad \text{Expression (A)}$$

$$\beta=100\times[V_2(O_2)]/([V_2(X)]+[V_2(O_2)]+[V_2(CO_2)]) \quad \text{Expression (B)}$$

here, $[V_1(X)]$ is a mixing ratio (volume %) of an inert gas included in the shielding gas, $[V_1(O_2)]$ is a mixing ratio (volume %) of oxygen included in the shielding gas, $[V_1(CO_2)]$ is a mixing ratio (volume %) of carbon dioxide included in the shielding gas, $[V_2(X)]$ is a mixing ratio (volume %) of an inert gas included in the oxidation promotion gas, $[V_2(O_2)]$ is a mixing ratio (volume %) of oxygen included in the oxidation promotion gas, and $[V_2(CO_2)]$ is a mixing ratio (volume %) of carbon dioxide included in the oxidation promotion gas.

(2) In the consumable electrode type gas shield arc welding method according to (1), the oxidation promotion gas may be blown via a space formed between the welding torch and an outer circumferential wall which is provided to be separated outward from an outer circumferential surface of the welding torch.

(3) In the consumable electrode type gas shield arc welding method according to (1) or (2), in a state where at least an upper region of a part of the weld bead or the weld toe portion in a state of 700° C. or higher is surrounded, the oxidation promotion gas may be blown within the upper region.

(4) In the consumable electrode type gas shield arc welding method according to any one of (1) to (3), a shortest separation distance in a horizontal direction between a portion over which the oxidation promotion gas is blown and a tip position of the consumable electrode in the weld bead and the weld toe portion may be 35 mm or shorter.

(5) According to a second aspect of the present invention, there is provided an arc welding portion formed by the consumable electrode type gas shield arc welding method according to any one of (1) to (4). A surface of a weld bead and a surface of a weld toe portion of the weld bead are covered with a conductive iron oxide slag containing any one of or both of magnetite and wustite.

(6) In the arc welding portion according to (5), the thickness of the conductive iron oxide slag may range from 10 μm to 50 μm.

(7) In the arc welding portion according to (5) or (6), all of the surface of the weld bead and the surface of the weld toe portion of the weld bead may be covered with the conductive iron oxide slag.

Effects of the Invention

In the method according to (1) to (4), the surfaces of the weld bead and the weld toe portion, which are formed by arc welding and are in a state of 700° C. or higher, are exposed to the oxidation promotion gas having the high oxygen potential β. Therefore, since the surfaces of the weld bead and the weld bead toe portion can be covered with the conductive iron oxide slag, no insulating Si/Mn-based slag appears on the surface. Therefore, even if a structural member including a welding portion is subjected to electrodeposition coating, poor electrodeposition coating does not occur in the welding portion. Thus, it is possible to enhance corrosion resistance of the structural member.

Particularly, in the method according to (2), the oxidation promotion gas is blown over the weld bead and the weld toe portion via the space formed on an outer circumference of the welding torch. Therefore, the oxidation promotion gas can be more reliably blown over the weld bead and the weld toe portion which are formed by arc welding and are in a state of 700° C. or higher, and the surfaces of the weld bead and the weld bead toe portion can be covered with the conductive iron oxide slag. Moreover, the workability of welding can also be enhanced.

In addition, in the method according to (3), since the oxidation promotion gas is blown within the region in a state where the upper region of the weld bead and the weld toe portion behind the welding torch in a progressing direction is surrounded, the oxidation promotion gas can be blown over the weld bead and the weld toe portion in a state of retaining high concentration. Therefore, the surfaces of the weld bead and the weld bead toe portion can be more reliably covered with the conductive iron oxide slag.

In addition, in the method according to (4), as a separation distance D is set to 35 mm or shorter, the oxidation promotion gas can be more reliably blown over the weld bead and the weld toe portion which are formed by arc welding and are in a state of 700° C. or higher, and the surfaces of the weld bead and the weld bead toe portion can be covered with the conductive iron oxide slag.

In the arc welding portion according to (5) to (7), since the surfaces of the weld bead and the weld toe portion are covered with the conductive iron oxide slag, no insulating Si/Mn-based slag appears on the surface. Therefore, even if the structural member including the welding portion is subjected to electrodeposition coating, no poor electrodeposition coating portion is generated in the welding portion. Therefore, it is possible to enhance the corrosion resistance of the structural member.

EMBODIMENT OF THE INVENTION

Figure 1A:
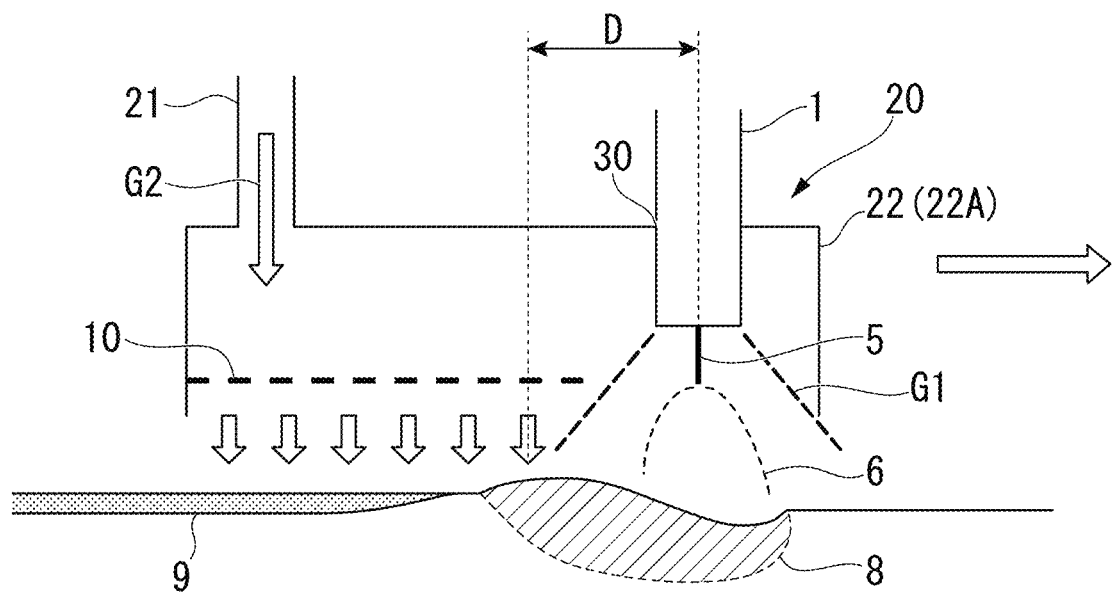
FIG. 1A is a longitudinal sectional view showing a consumable electrode type gas shield arc welding method according to an embodiment of the present invention.

In consumable electrode type gas shield arc welding, from a viewpoint of arc stability, a predetermined amount of an oxidized gas has to be mixed in a shielding gas. As in the countermeasures in the related art performed to prevent poor electrodeposition coating, in a case of employing a countermeasure in which the amount of an oxidized gas in a shielding gas is reduced or a countermeasure in which the amount of a Si/Mn-based slag is reduced by reducing oxidation components in a consumable electrode (welding wire), there is concern that the quality of welding may be adversely affected.

Therefore, the inventors of this application have evaluated a slag generation status and electrodeposition coating characteristics of a welding portion under various welding conditions using ordinary shielding gas and welding wires. As a result, it has been found that Si/Mn-based slag tends to be reduced under a condition in which a weld heat input is excessively increased, and electrodeposition coating characteristics are improved. Moreover, as a result of observing surfaces of a weld bead and a weld toe portion under the foregoing welding conditions, it has been checked that a conductive iron oxide ($FeO$, $Fe_3O_4$) is formed in a surface layer of the weld bead.

Since the cooling rate of a weld metal falls under a welding condition of a high heat input, a weld bead and a weld toe portion in a high temperature state after melting and solidification are likely to deviate from a region protected by a shielding gas. As a result, it is assumed that the weld bead and the weld toe portion in a high temperature state are exposed to the atmosphere, oxidation is promoted, and the surface layers of the weld bead and the weld toe portion are covered with an iron oxide film.

The invention of this application has been devised based on the findings described above. According to the invention, instead of preventing oxidation of a welding portion, the solidified surfaces of a weld bead and a weld toe portion are initiatively oxidized, so that a conductive iron oxide ($FeO$, $Fe_3O_4$) is generated and a Si oxide or a Mn oxide is covered with the iron oxide. Consequently, the surfaces of the weld bead and the weld toe portion become conductive.

Such a tendency has also been checked in the case where the welding rate is increased and a molten pool is widened rearward in a progressing direction. However, generally, the welding conditions are uniquely determined depending on the thickness of a steel sheet or the type of a joint to be applied. Accordingly, the welding conditions cannot be freely set for the purpose of controlling the amount of a generated slag. An excessive increase of a heat input causes burn-through of a steel sheet, and a raised welding rate leads to poor shapes of weld beads.

Therefore, the inventors of this application have progressed investigation aiming at forming a stable iron oxide film on a surface of a weld bead without depending on the weld heat input or the rate.

As a result, it is has been newly ascertained that if an oxidation promotion gas G2 having a high oxygen potential β is blown over a weld bead and a weld toe portion in a high temperature state behind an ordinary arc welding torch in the welding progressing direction, a shielding gas G1 having a low oxygen potential α and remaining on the surfaces of the weld bead and the weld toe portion can be eliminated and oxidation of iron on the surfaces of the weld bead and the weld toe portion is promoted, so that the surfaces of the weld bead and the weld toe portion can be covered with a conductive iron oxide including a Si oxide or a Mn oxide formed due to reaction to an oxidized gas in the shielding gas, and the present invention is thereby realized.

Hereinafter, an embodiment of the present invention devised based on the foregoing findings will be described in detail based on the drawings.

FIGS. 1 A and 1B are schematic views showing a gas shield arc welding method according to the present embodiment.

Figure 1B:
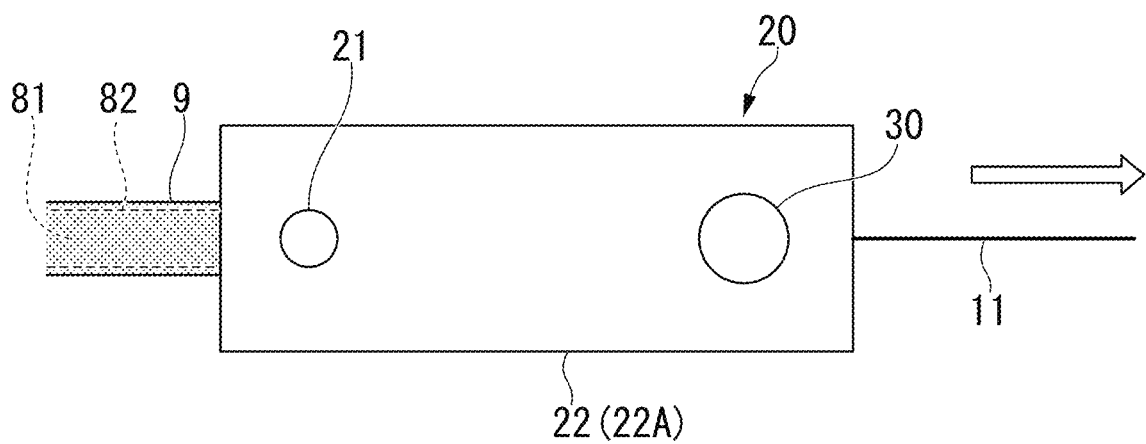
FIG. 1B is a top view showing the consumable electrode type gas shield arc welding method according to the same embodiment.

In the gas shield arc welding method according to the present embodiment, as shown in FIGS. 1A and 1B, two steel sheets are welded by means of a welding torch 1 having a consumable electrode, and an oxidation promotion gas blowing nozzle 22 (hood nozzle 22A) extending toward the opposite side of the welding torch 1 in the welding progressing direction.

In the present embodiment, a surface of a weld bead 81 and a surface of a weld toe portion 82, which is a boundary portion between the weld bead 81 and a steel (base metal), are covered with a conductive iron oxide slag 9 generated in a process of the consumable electrode type gas shield arc welding. Accordingly, an insulating Si/Mn-based slag generated during welding is enclosed within the conductive iron oxide slag 9.

As conductive slag which can be generated during welding, magnetite ($Fe_3O_4$) and wustite ($FeO$) are known.

Here, there is a need to acquire an arc welding portion which promotes oxidation of iron on a surface of a molten pool 8 or on the surfaces of the weld bead 81 and the weld toe portion 82 and is covered with the conductive iron oxide slag 9 having magnetite or wustite as a main constituent.

Magnetite or wustite (iron oxide) can be formed by exposing the surfaces of the weld bead 81 and the weld toe portion 82 in a high temperature state to an oxidizing atmosphere during welding, and the surface of the weld bead 81 and the surface of the weld toe portion 82 can be covered with a conductive iron oxide slag containing any one of or both magnetite and wustite.

It is preferable that not only the surface of the weld bead 81 and the surface of the weld toe portion 82 but also the surface of the molten pool 8, which is out of a shielding region formed by the shielding gas G1 from the welding torch 1, is exposed to an oxidizing atmosphere.

In the present embodiment, oxidation of iron is promoted by blowing the oxidation promotion gas G2 having a high oxygen potential β independently from the shielding gas G1 toward at least the surface of the weld bead 81 and the surface of the weld toe portion 82, such that the surfaces of the weld bead 81 and the weld toe portion 82 are covered with the conductive iron oxide slag 9.

In the gas shield arc welding method according to the present embodiment, when the consumable electrode type gas shield arc welding is performed, a shielding gas having a low oxygen potential α and including an inert gas or an oxidized gas and an inert gas is supplied to the consumable electrode. Immediately thereafter, the oxidation promotion gas G2 having a high oxygen potential β including a mixed gas of an oxidized gas and an inert gas is blown toward at least the weld bead 81 and the weld toe portion 82 in a high temperature state. Accordingly, the weld bead 81 and the weld toe portion 82 are entirely covered with the conductive iron oxide slag 9, and it is possible to acquire a welding portion in which an insulating Si/Mn-based slag is buried in the conductive iron oxide slag 9.

It is possible to check whether or not the conductive iron oxide slag 9 is formed by examining the composition on the surfaces of the weld bead 81 and the weld toe portion 82 through element mapping performed by means of an EPMA, or examining conductivity.

The range of the weld bead 81 and the weld toe portion 82 thereof after being welded by using the oxidation promotion gas G2 is cut and the cut section is polished. Then, element mapping is performed by means of the EPMA. Accordingly, it is possible to check that the vicinity of the surface observed in the cross section of the weld bead 81 and the weld toe portion 82 thereof is covered with the conductive iron oxide slag 9, the outermost surface of the conductive iron oxide slag 9 has become a substantial iron oxide, and a Si oxide or a Mn oxide forming an insulating Si/Mn-based slag is scarcely present on the outermost surfaces of the weld bead 81 and the weld toe portion 82.

Moreover, as a result of a measurement for conductivity between the surface of the iron oxide slag 9 and a steel sheet surface on the outer side of the weld bead 81 and the weld toe portion 82 using a commercially available tester, conductivity with a resistance value ranging from 40 to 1,000Ω has been checked. If an insulating Si/Mn-based slag is present on the surfaces of the weld bead 81 and the weld toe portion 82, electrical resistance becomes infinite or deviates from the measurement range of an ordinary conductor, so that a measurement cannot be performed by using a general tester which is commercially available.

(Welding Torch 1)

The welding torch 1 has a configuration in which a gap between a consumable electrode 5 and a peripheral wall section surrounding the consumable electrode 5 serves as a passage for the shielding gas G1. While the shielding gas G1 is supplied from the welding torch 1 toward the consumable electrode 5, arc welding is performed along a weld line formed between steel members disposed at welding positions.

(Consumable Electrode 5)

The consumable electrode 5 is not particularly limited. However, in order to reduce generation of a Si/Mn-based slag in the molten pool 8 as much as possible, it is desirable that the Si content is 1 mass % or less and the Mn content is 2 mass % or less.

(Shielding Gas G1)

The shielding gas G1 is a mixed gas in which an inert gas, such as Ar or He, is mixed with $O_2$ and/or $CO_2$ as a main constituent. The shielding gas G1 flows out from the welding torch 1 toward a region surrounding the consumable electrode 5 (welding wire) and arc plasma. Since the shielding gas G1 plays a role of ensuring stability of an arc, in addition to causing the atmosphere in a region in which arc plasma has occurred to be replaced with the air, the mixing ratio of an inert gas, $O_2$, and $CO_2$ is adjusted such that the oxygen potential α indicated by the following Expression (1) becomes 1.5% or higher, preferably becomes 2.0%, and more preferably becomes 4.0%.

$$\alpha=100\times([V_1(O_2)]+[V_1(CO_2)]/5)/([V_1(X)]+[V_1(O_2)]+[V_1(CO_2)]) \quad \text{Expression (1)}$$

In Expression (1), $[V_1(X)]$ is the mixing ratio (volume %) of an inert gas included in the shielding gas G1, $[V_1(O_2)]$ is the mixing ratio (volume %) of oxygen included in the shielding gas G1, and $[V_1(CO_2)]$ is the mixing ratio (volume %) of carbon dioxide included in the shielding gas G1.

Meanwhile, in a case where the oxygen potential α of the shielding gas G1 exceeds 5%, a Si/Mn-based slag is excessively generated on the surface of the molten pool 8. Therefore, even if the oxidation promotion gas G2 is blown afterward, the surfaces of the weld bead 81 and the weld toe portion 82 cannot be covered with a conductive iron oxide.

Therefore, the amount of $O_2$ and/or $CO_2$ is adjusted such that the oxygen potential α of the shielding gas G1 becomes 5% or lower, preferably becomes 4.5% or lower, and more preferably becomes 4.0% or lower.

(Oxidation Promotion Gas G2)

The oxidation promotion gas G2 is a mixed gas in which at least two of an inert gas (nitrogen, argon, He, or the like), $O_2$, and $CO_2$ are mixed. It is convenient to use air ($O_2$: 15% to 25%, nitrogen: 75% to 85%). In addition, even in a case where air is used, the degree of progress of oxidation can be adjusted by further adding an oxygen gas.

The oxidation promotion gas G2 is blown over a region of the weld bead 81 and the weld toe portion 82 at 700° C. or higher behind the molten pool 8. Since the oxidation promotion gas G2 plays a role of promoting oxidation of iron on the surfaces of the weld bead 81 and the weld toe portion 82 and causing an insulating Si/Mn-based slag formed in the molten pool 8 to be replaced with a conductive iron oxide (FeO, $Fe_3O_4$), the mixing ratio of an inert gas, $O_2$, and $CO_2$ is adjusted such that the oxygen potential β indicated by the following Expression (2) becomes 15%, preferably becomes 20% or higher, and more preferably becomes 25% or higher.

$$\beta=100\times[V_2(O_2)]/([V_2(X)]+[V_2(O_2)]+[V_2(CO_2)]) \quad \text{Expression (2)}$$

In Expression (2), $[V_2(X)]$ is the mixing ratio (volume %) of an inert gas included in the oxidation promotion gas G2, $[V_2(O_2)]$ is the mixing ratio (volume %) of oxygen included in the oxidation promotion gas G2, and $[V_2(CO_2)]$ is the mixing ratio (volume %) of carbon dioxide included in the oxidation promotion gas G2.

The action of $CO_2$ is different between the shielding gas G1 and the oxidation promotion gas G2.

The $CO_2$ included in the shielding gas G1 used in a region of generating arc plasma is dissociated due to heat of plasma, thereby acting as an oxidized gas.

Meanwhile, the $CO_2$ included in the oxidation promotion gas G2 used in a region in which the temperature is equal to or lower than the melting point of iron (approximately 1,500° C.) is present as stable $CO_2$, there by acting as an inert gas.

Therefore, unlike the oxygen potential α of the shielding gas G1, the oxygen potential β of the oxidation promotion gas G2 does not include $CO_2$ in the numerator in the computation expression.

The thickness of an iron oxide formed by the oxidation promotion gas ranges from 10 to 50 μm, which is greater than the thickness of an iron oxide film formed on the surface of the weld bead 81 by only the ordinary shielding gas G1, that is, the thickness of an oxide film (approximately 5 μm at the maximum) formed out of the region of a Si/Mn-based slag generation portion.

(Oxidation Promotion Gas Blowing Unit 20)

In the gas shield arc welding according to the present embodiment, when a steel member is welded by the gas shield arc welding while the shielding gas G1 is supplied, the oxidation promotion gas blowing unit 20 blows the oxidation promotion gas G2 including an oxidized gas over the surfaces of the weld bead 81 and the weld toe portion 82 behind the consumable electrode 5 and the welding torch 1. Accordingly, the surfaces of the weld bead 81 and the weld toe portion 82 are covered with a conductive iron oxide layer. The oxidation promotion gas G2 may also be blown over the molten pool 8 behind the consumable electrode 5 and the welding torch 1 as long as the external appearance of the bead does not deteriorate.

An oxidation promotion gas blowing unit 20 which blows the oxidation promotion gas G2 over the surfaces of the weld bead 81 and the weld toe portion 82 has an oxidation promotion gas supply portion 21 for supplying the oxidation promotion gas G2, and the oxidation promotion gas blowing nozzle 22 for blowing the oxidation promotion gas G2.

Figure 2:
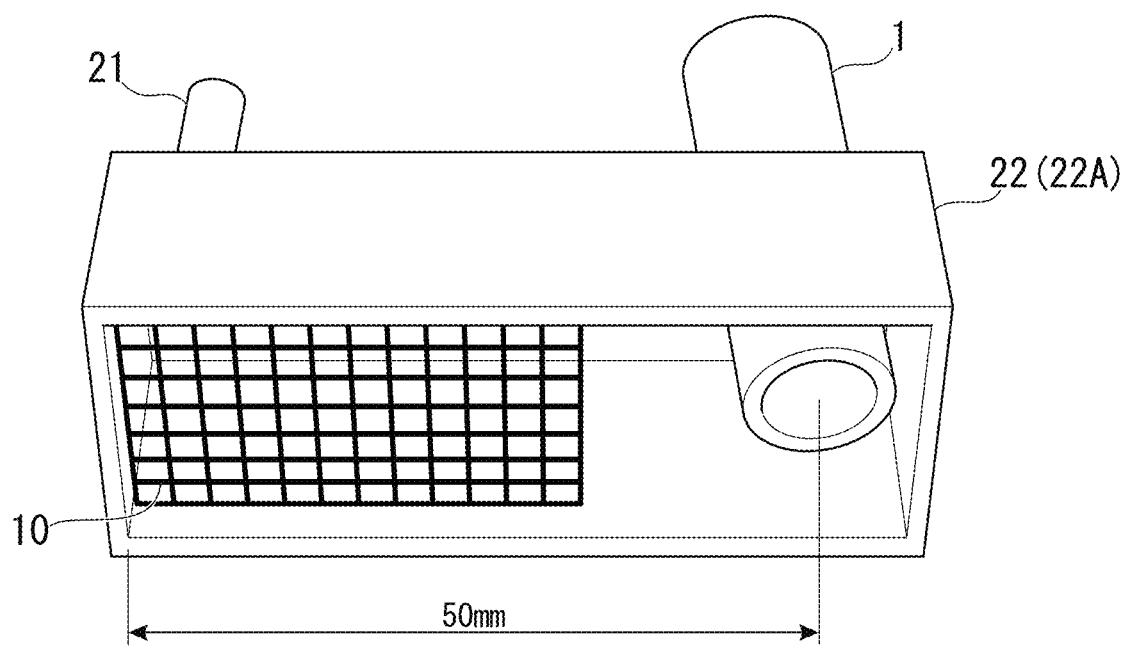
FIG. 2 is a view of an oxidation promotion gas blowing unit which is seen from below and is used in the consumable electrode type gas shield arc welding method according to the same embodiment.

As an example of the oxidation promotion gas blowing nozzle 22, FIGS. 1A, 1B, and 2 show the hood nozzle 22A. The hood nozzle 22A has a rectangular upper surface and side surfaces which fall from edge portions of the upper surface. The hood nozzle 22A has a shape surrounding an upper region of the weld bead 81 and the weld toe portion 82 on the periphery of the welding torch 1. On the upper surface of the hood nozzle 22A, the oxidation promotion gas supply portion 21 is provided on one end side in a longitudinal direction, and a torch insertion hole 30 through which the welding torch 1 can be inserted is formed on the other end side in the longitudinal direction.

The oxidation promotion gas G2 is supplied from the oxidation promotion gas supply portion 21 to the inside of the hood nozzle 22A in a state where the welding torch 1 is inserted through the torch insertion hole 30 and is integrated therewith. The oxidation promotion gas G2 is blown over the surface of the molten pool 8, and the surfaces of the weld bead 81 and the weld toe portion 82 in a state where a high oxygen potential β is maintained.

The hood nozzle 22A may be formed to be integrated with the tip of the oxidation promotion gas supply portion 21 or may be detachably formed.

In addition, the hood nozzle 22A can employ any of a shape in which a lower portion is open as in FIG. 2, and a box shape in which a number of gas blow-out holes are formed on the lower surface. In addition, even a nozzle having an open lower portion may have a shape in which a gas lens 10 such as wire gauze is attached to a location in the vicinity of an open end portion. Moreover, a partition wall can be internally provided in the vicinity of the welding torch 1 such that the oxidation promotion gas G2 does not hinder a flow of the shielding gas G1.

When welding is performed, the shielding gas G1 is discharged from the welding torch 1, and the welding torch 1 moves along a weld line 11 in the arrow direction while the periphery of an arc 6 generated by the consumable electrode 5 and the periphery of the molten pool 8 are shielded. In this case, the oxidation promotion gas G2 including an oxidized gas is supplied to the inside of the hood nozzle 22A from the oxidation promotion gas supply portion 21 provided at the rear portion of the hood nozzle 22A, and the oxidation promotion gas G2 is blown over the surfaces of the weld bead 81 and the weld toe portion 82.

(Blowing Range of Oxidation Promotion Gas G2)

In a case where the temperature of the surfaces of the weld bead 81 and the weld toe portion 82 is 700° C. or higher, oxidation reaction becomes noticeable between an oxidized gas in the oxidation promotion gas G2 and Fe. Therefore, in order to form the conductive iron oxide slag 9 on the surfaces of the weld bead 81 and the weld toe portion 82, the oxidation promotion gas G2 is blown over a portion in which the temperature of the surfaces of the weld bead 81 and the weld toe portion 82 is 700° C. or higher, a portion in which the temperature thereof is more preferably 750° C. or higher, and a portion in which the temperature thereof is more preferably 800° C. or higher.

The temperature of the surfaces of the weld bead 81 and the weld toe portion 82 can be measured with a radiation-type thermometer. In addition, the temperature of 700° C. or higher may be checked based on the relationship between the color and the temperature of iron.

As described above, the oxidation promotion gas G2 is required to be blown over a portion in which the temperature of the surfaces of the weld bead 81 and the weld toe portion 82 is 700° C. or higher. Therefore, a shortest separation distance D in a horizontal direction between a portion over which the oxidation promotion gas G2 is blown and a tip position of the consumable electrode 5 in the weld bead 81 and the weld toe portion 82 is preferably 35 mm or shorter and is more preferably 30 mm or shorter.

Meanwhile, in a case where the shortest separation distance D is 10 mm or longer, $O_2$ or $CO_2$ in the oxidation promotion gas G2 can be prevented from being incorporated into the shielding gas G1 in an arc generation region of the welding torch 1. Therefore, the form of discharging an arc can be stabilized, and a Si/Mn-based slag can be prevented from increasing. Thus, it is preferable that the shortest separation distance D is 10 mm or longer.

(Flow Rate of Oxidation Promotion Gas G2)

The flow rate of the oxidation promotion gas G2 is preferably 5 L/min or more, which is required for progress of oxidation of iron, and is more preferably 7 L/min or more. It is preferable that the flow rate of the oxidation promotion gas G2 is equal to or less than the flow rate of the shielding gas G1 such that shielding by the shielding gas G1 is not disrupted.

(Flow Velocity of Oxidation Promotion Gas G2)

The gas flow velocity of the oxidation promotion gas G2 at a nozzle outlet is set to range from 1 m/sec to 3 m/sec. The flow velocity of the oxidation promotion gas G2 is a value obtained by dividing the flow rate (L/min) of the oxidation promotion gas G2 by the cross-sectional area of a portion in the nozzle outlet through which the oxidation promotion gas G2 is discharged.

In order to promote oxidation on the surfaces of the weld bead 81 and the weld toe portion 82 by the oxidation promotion gas G2, the atmosphere of the surfaces of the weld bead 81 and the weld toe portion 82 having the components of the shielding gas G1 is required to be replaced with the atmosphere having the components of the oxidation promotion gas G2.

If the flow velocity of the oxidation promotion gas G2 is 1 m/sec or slower, the atmosphere having the shielding gas G1 as a main constituent in the upper region of the surfaces of the weld bead 81 and the weld toe portion 82 cannot be sufficiently replaced with the atmosphere having the oxidation promotion gas G2 as a main constituent. Meanwhile, if the flow velocity of the oxidation promotion gas G2 exceeds 3 m/sec, there is concern that the components of the oxidation promotion gas G2 may be incorporated into the shielding gas G1 of an arc generation portion and a Si/Mn-based slag may be excessively generated on the surface of the molten pool. In addition, since shielding by the shielding gas G1 is disrupted and an arc becomes unstable, there is concern that the weld bead may be hindered from being formed.

Therefore, the flow velocity of the oxidation promotion gas G2 is set to range from 1 m/sec to 3 m/sec and is more preferably set to range from 1.5 m/sec to 2.5 m/sec.

In order to ensure electrodeposition coating characteristics, it is preferable that all of the surfaces of the weld bead 81 and the weld toe portion 82 thereof are covered with only the conductive iron oxide slag 9.

In order to cause the weld bead 81 and the weld toe portion 82 to be conductive, it is preferable that the weld bead 81 and the weld toe portion 82 are covered with the iron oxide slag 9 having a thickness of 10 μm or greater from the surface. The thickness of the iron oxide slag 9 is more preferably 15 μm or greater.

Meanwhile, in a case where the iron oxide slag 9 having an excessive thickness is formed on the surfaces of the weld bead 81 and the weld toe portion 82 thereof, there is concern that peeling of coating may occur. Therefore, the thickness of the iron oxide slag 9 is preferably 50 μm or smaller and is more preferably 40 μm or smaller.

The arc welding method according to the present embodiment is applied to well-known consumable electrode type gas shield arc welding (also referred to as gas metal arc welding). The welding conditions are not particularly limited, and ordinary conditions can be used.

However, since submerged arc welding is welding in which no shielding gas is used, the submerged arc welding does not belong to the present invention. In addition, in the submerged arc welding, since flux scattered before welding melts and is solidified at the time of welding, a thick slag having a thickness ranging approximately from 5 to 10 mm covers the weld bead. A Si/Mn-based slag is scarcely present on the surface of the weld bead after the thick slag is removed, and the surface of the weld bead is covered with a thin iron oxide film having a thickness of approximately 5 μm or smaller. That is, the forms of the weld bead and the toe portion in this application, in which an iron oxide having a thickness ranging from 15 to 50 μm is formed on the surfaces of the weld bead and the toe portion using an oxidation promotion gas, differ from those in the submerged arc welding.

Welding may be lap welding or butt welding.

The thickness and the tensile strength of a steel sheet are not particularly limited. However, the sheet thickness ranging from 1.6 to 3.2 mm and the tensile strength ranging from 440 to 980 MPa are applied as standards. In addition, it is possible to use a hot-dip galvanized steel sheet, a galvannealed steel sheet, an aluminized steel sheet, and the like.

The components of a steel sheet and the components of a welding material are not particularly limited as well. However, in order to reduce generation of a Si/Mn-based slag in the molten pool as much as possible, it is desirable that the steel sheet and the welding material each have the Si content of 1 mass % or less and the Mn content of 2 mass % or less. In addition, homogeneous steel sheets may be welded together, or heterogeneous steel sheets may be welded together.

Hereinabove, the present invention has been described in detail based on the embodiment. However, the above-described embodiment presents merely a specific example for executing the present invention. The technical scope of the present invention should not be interpreted restrictively by the embodiment.

For example, in the description above, as shown in FIGS. 1A, 1B, and 2, the hood nozzle 22A is used as the oxidation promotion gas blowing nozzle 22 to blow the oxidation promotion gas G2. However, the following modification examples may be employed.

Figure 3A:
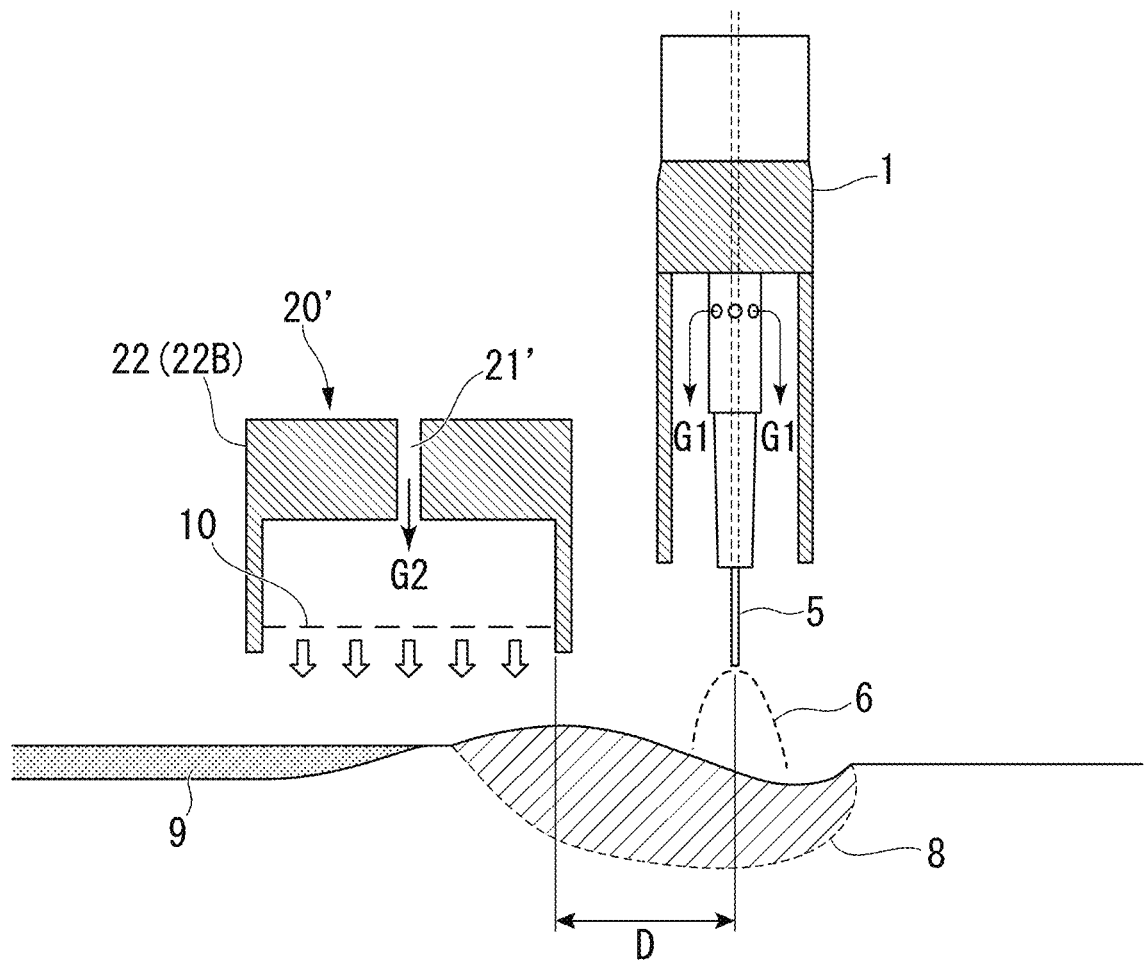
FIG. 3A is a longitudinal sectional view showing an oxidation promotion gas blowing unit according to a first modification example.
Figure 3B:
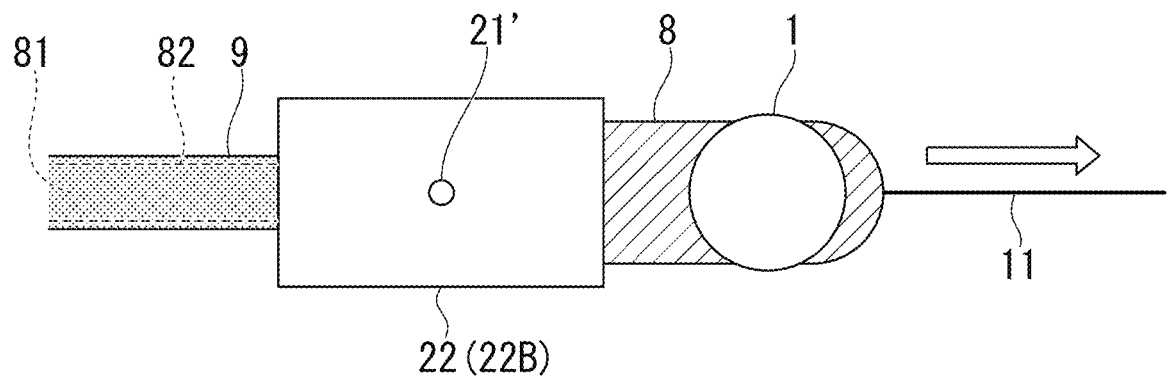
FIG. 3B is a top view showing the oxidation promotion gas blowing unit according to the same modification example.

As a first modification example, as shown in FIGS. 3A and 3B, an oxidation promotion gas blowing unit 20' for blowing the oxidation promotion gas G2 from an after nozzle 22B to which an oxidation promotion gas supply portion 21' is connected may be employed.

In the oxidation promotion gas blowing unit 20', the after nozzle 22B having a rectangular shape in a plan view is disposed behind the welding torch 1 to move together with the welding torch 1. Then, the oxidation promotion gas G2 is supplied from the oxidation promotion gas supply portion 21' provided on the upper surface of the after nozzle 22B, and the oxidation promotion gas G2 is mainly blown over the surfaces of the weld bead 81 and the weld toe portion 82 from a lower end of the after nozzle 22B. Accordingly, oxidation of iron can progress, and the weld bead 81 and the weld toe portion 82 can be covered with the conductive iron oxide slag 9.

The shape of the after nozzle 22B may be a circular shape in a plan view as in FIGS. 3A and 3B. The after nozzle 22B may have a shape in which a lower portion is open or a box shape in which a number of gas blow-out holes are formed on the lower surface. In addition, even a nozzle having an open lower portion may have a shape in which the gas lens 10 such as wire gauze is attached to a location in the vicinity of an open end portion.

Figure 4:
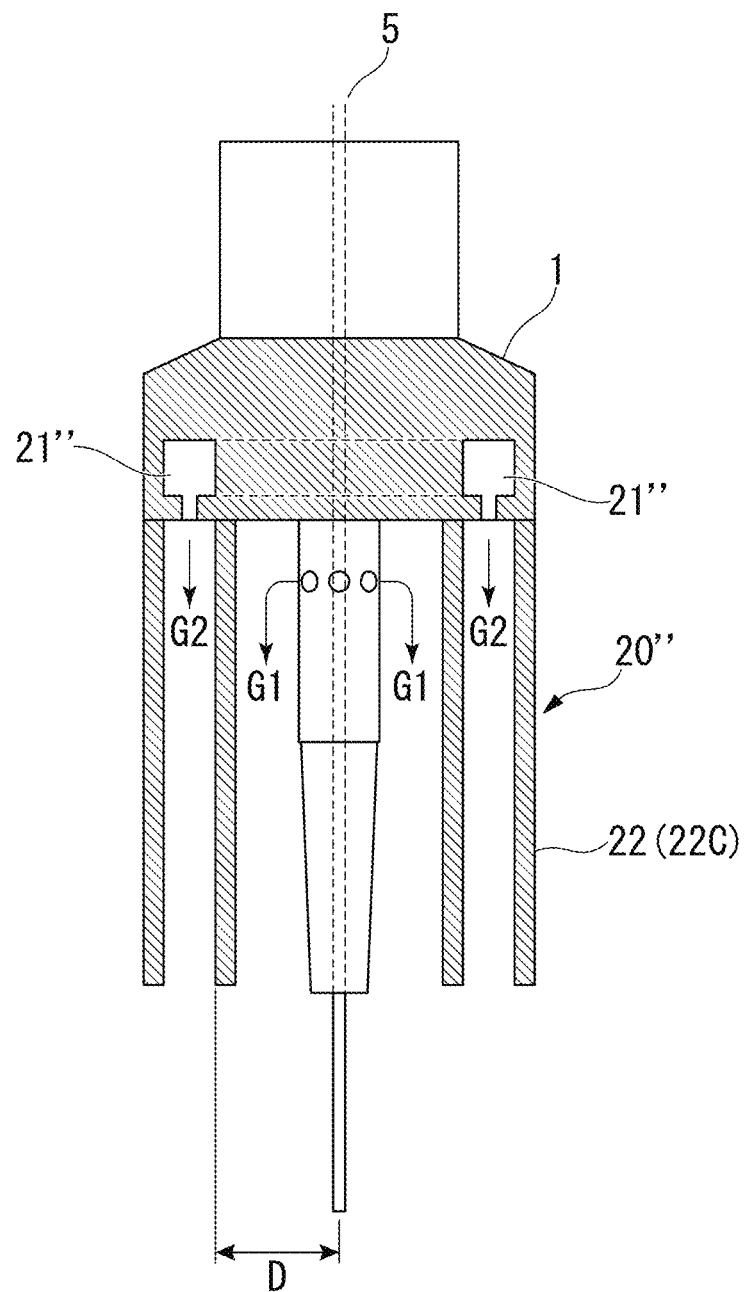
FIG. 4 is a cross-sectional view of a welding torch showing an oxidation promotion gas blowing unit according to a second modification example.

As a second modification example, as shown in FIG. 4, a co-axial nozzle 22C may be used as an oxidation promotion gas blowing unit 20". The co-axial nozzle 22C is constituted by providing an outer circumferential wall to be separated outward from an outer circumferential surface of the welding torch 1. In this structure, the oxidation promotion gas G2 supplied from an oxidation promotion gas supply portion 21" is blown via a space formed between the outer circumferential surface and the outer circumferential wall.

EXAMPLE

Based on the following Examples, the practicability of the present invention and the feasibility of the effect of the invention of this application will be described.

Lap fillet welding of gas shield arc welding was performed with respect to Steel sheets (A) and steel sheets (B) having the components, the sheet thickness, and the tensile strength as shown in Table 1 by causing end portions of the steel sheets (A) to overlap each other and causing end portions of the steel sheets (B) to overlap each other. In this case, pulse magnetron welding was performed by using a solid wire (J1S Z 3312, YGW16) having the components and the diameter as shown in Table 2. Table 3 shows specific welding conditions.

TABLE 1

| Steel sheet sign | Component (mass %) | | | | | | | | Sheet thickness (mm) | TS (MPa) | Remarks |
|---|---|---|---|---|---|---|---|---|---|---|---|
| | C | Si | Mn | Al | P | S | Ti | Nb | | | |
| A | 0.06 | 0.8 | 1.8 | 0.02 | 0.01 | 0.004 | 0.02 | 0.03 | 2.6 | 780 | Non-plating material |
| B | 0.09 | 0.01 | 1.4 | 0.003 | 0.01 | 0.005 | 0.001 | 0.03 | 2.0 | 590 | GA plating material |

TABLE 2

| Component (mass %) | | | | | Diameter (mm) |
|---|---|---|---|---|---|
| C | Si | Mn | P | S | |
| 0.06 | 0.8 | 1.5 | 0.01 | 0.005 | 1.2 |

TABLE 3

| Current (A) | Voltage (V) | Power source | Welding rate (cm/min) | Heat input amount (kJ/cm) | Separation distance between tip end and steel sheet (mm) | Inclination angle of torch (°) | Target value of width of weld bead (mm) |
|---|---|---|---|---|---|---|---|
| 150 | 19 | Pulse | 60 | 2.9 | 15 | 60 | 8 |

Table 4 shows the experimental conditions and the evaluation result of each of Experimental Examples 1 to 19.

In the shielding gas G1, the oxygen potential α was adjusted by adjusting the amounts of Ar, $O_2$, and $CO_2$.

In Table 4, a indicates an oxygen potential of the shielding gas G1 calculated by Expression (1), and β indicates an oxygen potential of the oxidation promotion gas G2 calculated by Expression (2). The gas flow rates of the shielding gas G1 and the oxidation promotion gas G2 are values divided by the cross-sectional area of a portion in the nozzle outlet through which the oxidation promotion gas G2 is discharged.

In regard to the oxidation promotion gas G2, the nozzle type, the blowing position, and the gas flow velocity are also indicated.

The nozzle type is specified as Aft.N (after nozzle) in the case where an after nozzle is used as shown in FIGS. 3A and 3B and is specified as C.N (co-axial nozzle) in the case where a co-axial nozzle is used as shown in FIG. 4.

In Experimental Examples using the after nozzle, welding was performed while the oxidation promotion gas G2 was supplied to the inside of the after nozzle at the same time the shielding gas G1 flowed from the welding torch.

The width of the after nozzle (with respect to the weld line) was set to 25 mm such that the surface of the toe portion of the weld bead (melting solidification portion) can also be covered with an iron oxide.

In these Experimental Examples, the distance from a location immediately below the arc to the rearmost location of the after nozzle was approximately 50 mm, and the temperature of the bead surface at the position was approximately 700° C.

As the welding torch, a circular torch having an inner diameter of 16 mm (outer diameter of 20 mm) in a cross section of the passage for the shielding gas G1 was used.

The field of "Blowing position" in Table 4 is filled with the shortest separation distances D in the horizontal direction between a portion over which the oxidation promotion gas is blown and the tip position of the consumable electrode in the weld bead and the weld toe portion. In the case where the after nozzle is used as shown in FIGS. 3A and 3B, the separation distance in the horizontal direction between the tip of the consumable electrode 5 and the outlet through which the oxidation promotion gas G2 is discharged in the oxidation promotion gas blowing unit 20' is applied. In the case where the co-axial nozzle having a double shielding structure is used as shown in FIG. 4, the separation distance in the horizontal direction between the tip of the consumable electrode 5 and the outlet through which the oxidation promotion gas G2 is discharged in the oxidation promotion gas blowing unit 20" is applied.

The gas flow velocity is a flow velocity at the nozzle tip.

As the evaluation result, Table 4 shows (1) the adhesion area ratio of the Si/Mn-based slag, (2) the conductivity, (3) the area ratio of poor coating, (4) the presence or absence of the iron oxide after an examination of a cross section. The evaluation method will be described below.

(1) Adhesion Area Ratio of Si/Mn-based Slag

A photograph of the surfaces of the weld bead and the weld toe portion was captured. From the image thereof, the dark brown glassy slag was considered as a Si/Mn-based slag, and the ratio of the slag area to the weld bead area was measured.

(2) Conductivity

Resistance between the slag on the surfaces of the weld bead and the weld toe portion and the steel sheet was measured for conductivity at ten locations applying a general purpose tester (POCKET TESTER MODEL: CDM-03D). In the case where the resistance value was infinite, the slag was determined to be insulated and x was applied. The bead surface covered with oxidized iron indicated the resistance value ranging from 40 to 1,000Ω.

(3) Area Ratio of Poor Coating

After a welding test piece was subjected to degreasing and chemical conversion, electrodeposition coating was performed to realize a target film thickness of 20 μm. Similar to measuring of the slag area ratio, a photograph of a weld bead coating portion was captured. From the image thereof, the ratio of the poorly coated area to the weld bead area was measured.

(4) Presence or Absence of Iron Oxide after Examination of Cross Section

In the case where an iron-based oxide having the concentration of iron of 30% or higher and the thickness of 10 μm or greater was checked in an observation of a cross section by means of the EPMA, ○ was applied.

TABLE 4

| | | Shielding gas (G1) | | | | | Oxidation promotion gas (G2) | | | | | | |
|---|---|---|---|---|---|---|---|---|---|---|---|---|---|
| | Steel sheet sign | Ar (vol. %) | $O_2$ (vol. %) | $CO_2$ (vol. %) | α (%) | Gas flow rate (L/min) | Nozzle type | Blowing position (mm) | Ar (vol. %) | $O_2$ (vol. %) | $CO_2$ (vol. %) | β (%) | Gas flow rate (L/min) |
| Experimental Example 1 | A | 80 | 0 | 20 | 4.0 | 20 | C.N | 10 | 80 | 20 | 0 | 20.0 | 20 |
| Experimental Example 2 | A | 98 | 2 | 0 | 2.0 | 20 | C.N | 10 | 0 | 15 | 85 | 15.0 | 40 |
| Experimental Example 3 | A | 87 | 3 | 10 | 5.0 | 25 | C.N | 10 | 50 | 50 | 0 | 50.0 | 40 |
| Experimental Example 4 | A | 80 | 0 | 20 | 4.0 | 25 | C.N | 10 | 0 | 20 | 80 | 20.0 | 30 |
| Experimental Example 5 | B | 87 | 3 | 10 | 5.0 | 25 | C.N | 10 | 80 | 20 | 0 | 20.0 | 30 |
| Experimental Example 6 | B | 75 | 0 | 25 | 5.0 | 25 | C.N | 10 | 80 | 20 | 0 | 20.0 | 30 |
| Experimental Example 7 | B | 80 | 0 | 20 | 4.0 | 25 | Aft.N | 15 | 80 | 20 | 0 | 20.0 | 30 |
| Experimental Example 8 | B | 95 | 0 | 5 | 1.0 | 25 | Aft.N | 20 | 0 | 15 | 85 | 15.0 | 40 |
| Experimental Example 9 | A | 80 | 0 | 20 | 4.0 | 25 | C.N | 10 | 0 | 70 | 30 | 70.0 | 40 |
| Experimental Example 10 | A | 80 | 0 | 20 | 4.0 | 25 | C.N | 10 | 0 | 10 | 90 | 10.0 | 40 |
| Experimental Example 11 | A | 80 | 0 | 20 | 4.0 | 25 | C.N | 10 | 0 | 20 | 80 | 20.0 | 60 |
| Experimental Example 12 | A | 80 | 0 | 20 | 4.0 | 25 | C.N | 10 | 80 | 20 | 0 | 20.0 | 15 |
| Experimental Example 13 | A | 60 | 0 | 40 | 8.0 | 25 | C.N | 10 | 0 | 20 | 80 | 20.0 | 40 |
| Experimental Example 14 | A | 97 | 0 | 3 | 0.6 | 25 | C.N | 10 | 0 | 20 | 80 | 20.0 | 30 |
| Experimental Example 15 | A | 80 | 0 | 20 | 4.0 | 25 | Aft.N | 35 | 0 | 20 | 80 | 20.0 | 40 |
| Experimental Example 16 | A | 80 | 0 | 20 | 4.0 | 25 | | | | None | | | |
| Experimental Example 17 | A | 97 | 3 | 0 | 3.0 | 20 | | | | None | | | |
| Experimental Example 18 | A | 88 | 0 | 12 | 2.4 | 20 | | | | None | | | |
| Experimental Example 19 | A | 100 | 0 | 0 | 0.0 | 20 | C.N | 10 | 90 | 10 | 0 | 10.0 | 20 |

| | Oxidation promotion gas (G2) Gas flow velocity (m/s) | Adhesion area ratio of Si/Mn-based slag (%) | Conductivity of slag | Area ratio of poor coating (%) | Presence or absence of iron oxide after examination of cross section | Classification | Remarks |
|---|---|---|---|---|---|---|---|
| Experimental Example 1 | 1.2 | 0.0 | ○ | 0.0 | ○ | Inventional Example | |
| Experimental Example 2 | 2.3 | 0.0 | ○ | 0.0 | ○ | Inventional Example | |
| Experimental Example 3 | 2.3 | 1.4 | ○ | 0.0 | ○ | Inventional Example | |
| Experimental Example 4 | 1.7 | 0.8 | ○ | 0.0 | ○ | Inventional Example | |
| Experimental Example 5 | 1.7 | 0.0 | ○ | 0.0 | ○ | Inventional Example | |
| Experimental Example 6 | 1.7 | 2.4 | ○ | 0.0 | ○ | Inventional Example | |
| Experimental Example 7 | 1.7 | 0.0 | ○ | 0.0 | ○ | Inventional Example | |
| Experimental Example 8 | 1.5 | 0.0 | ○ | 0.0 | ○ | Inventional Example | |
| Experimental Example 9 | 2.3 | 0.0 | X | 14.3 | ○ | Comparative Example | Peeling of coating |
| Experimental Example 10 | 2.3 | 7.8 | X | 5.6 | X | Comparative Example | |
| Experimental Example 11 | 3.5 | 14.5 | X | 11.4 | X | Comparative Example | |
| Experimental Example 12 | 0.9 | 6.8 | X | 5.1 | X | Comparative Example | |
| Experimental Example 13 | 2.3 | 11.1 | X | 7.7 | X | Comparative Example | |

TABLE 4-continued

| | | | | | | | |
|---|---|---|---|---|---|---|---|
| Experimental Example 14 | 1.7 | — | — | — | — | Comparative Example | Poor bead forming |
| Experimental Example 15 | 1.5 | 6.6 | X | 5.9 | X | Comparative Example | |
| Experimental Example 16 | None | 7.8 | X | 6.3 | X | Comparative Example | |
| Experimental Example 17 | None | 5.2 | X | 4.6 | X | Comparative Example | |
| Experimental Example 18 | None | 4.7 | X | 3.8 | X | Comparative Example | |
| Experimental Example 19 | 1.2 | — | — | — | — | Comparative Example | Poor bead forming |

In Experimental Examples 1 to 8 belonging to Inventional Examples, the oxidation promotion gas G2 was blown over the surfaces of the weld bead and the weld toe portion under appropriate conditions. Accordingly, the weld bead and the weld toe portion could be covered with a conductive iron oxide slag. Therefore, the adhesion area ratio of the Si/Mn-based slag on the outermost surfaces of the weld bead and the toe portion thereof is controlled, and there was no occurrence of poor coating as in the case where electrodeposition coating was performed.

In Experimental Example 9, since the oxygen potential β of the oxidation promotion gas G2 was excessive, a conductive iron oxide slag was excessively formed on the surfaces of the weld bead and the weld toe portion. Therefore, peeling of coating occurred.

in Experimental Example 10, since the oxygen potential β of the oxidation promotion gas G2 was deficient, a conductive iron oxide slag was not sufficiently formed on the surfaces of the weld bead and the weld toe portion. Therefore, poor coating occurred.

In Experimental Example 11, since the flow velocity of the oxidation promotion gas G2 was excessive, the components of the oxidation promotion gas G2 had been incorporated into the shielding gas of the arc generation portion. Therefore, a Si/Mn-based slag to be formed on the surface of the molten pool was excessively generated. Accordingly, even if the oxidation promotion gas G2 was within a proper range afterward, the surfaces of the weld bead and the weld toe portion could not be covered with a conductive iron oxide slag. Therefore, poor coating occurred.

In Experimental Example 12, since the flow velocity of the oxidation promotion gas G2 was deficient, the atmosphere of the surfaces of the weld bead and the weld toe portion could not be replaced with the oxidation promotion gas G2. Therefore, the surfaces of the weld bead and the weld toe portion could not be sufficiently covered with a conductive iron oxide slag. Therefore, poor coating occurred.

In Experimental Example 13, since the oxygen potential α of the shielding gas G1 was excessive, a Si/Mn-based slag to be formed on the surface of the molten pool was excessively generated. Accordingly, even if the oxidation promotion gas G2 was within a proper range afterward, the surfaces of the weld bead and the weld toe portion could not be covered with a conductive iron oxide slag. Therefore, poor coating occurred.

In Experimental Example 14, since the oxygen potential α of the shielding gas G1 was deficient, the arc welding state became unstable. Therefore, a poorly formed bead was caused.

In Experimental Example 15, since the blowing position of the oxidation promotion gas G2 was excessively far from the consumable electrode 5, the oxidation promotion gas G2 was blown over the position in which the temperature of the surfaces of the weld bead and the weld toe portion was lower than 700° C., so that the surfaces of the weld bead and the weld toe portion could not be covered with a conductive iron oxide slag. Therefore, poor coating occurred.

In Experimental Example 16, since no oxidation promotion gas G2 was used, the surfaces of the weld bead and the weld toe portion could not be covered with a conductive iron oxide slag. Therefore, poor coating occurred.

Similar to Experimental Example 16, Experimental Example 17 and Experimental Example 18 were also experimental examples in which no oxidation promotion gas G2 was used. The conditions in Patent Document 1 were postulated, and the shielding gas G1 was set to have Ar=97% and $O_2$=3%, or Ar=88% and $CO_2$=12%. In these Experimental Examples as well, since the components of the shielding gas remaining on the surfaces of the weld bead and the weld toe portion immediately after welding was not replaced by the oxidation promotion gas G2, the surfaces of the weld bead and the weld toe portion could not be covered with a conductive iron oxide. Therefore, poor coating occurred.

In Experimental Example 19, the conditions in Patent Document 2 and Experimental Example 3 were postulated. The oxygen potential α of the shielding gas G1 was set to 0.0% and the oxygen potential β of the oxidation promotion gas G2 supplied from the co-axial nozzle was set to 10.0%.

In this Experimental Example, since the oxygen potential α of the shielding gas G1 was deficient, the arc welding state became unstable, and a poorly formed bead was caused. Moreover, since the oxygen potential β of the oxidation promotion gas G2 was deficient, a conductive iron oxide slag was not sufficiently formed on the surfaces of the weld bead and the weld toe portion, and poor coating occurred.

Figure 5:
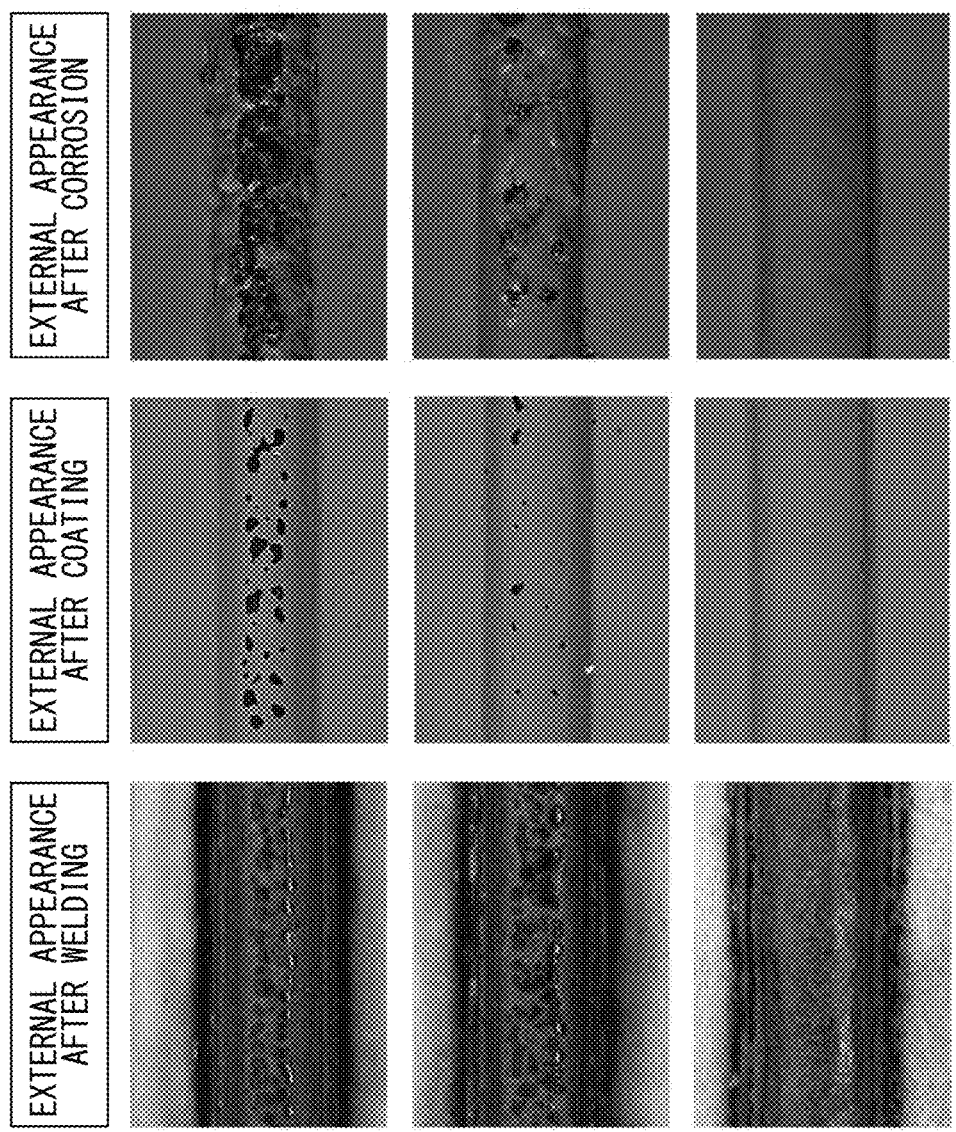
FIG. 5 are photographs showing the external appearance after welding, the external appearance after coating, and the external appearance after corrosion in Comparative Example (Experimental Example 16) in which no oxidation promotion gas G2 is used, Comparative Example (Experimental Example 19) in which an oxygen potential β of the oxidation promotion gas G2 is set to 10.0%, and Inventional Example (Experimental Example 2) in which the oxygen potential β of the oxidation promotion gas G2 is set to 15.0%.

FIG. 5 are photographs showing the external appearance after welding, the external appearance after coating, and the external appearance after corrosion in Comparative Example (Experimental Example 16) in which no oxidation promotion gas was used, Comparative Example (Experimental Example 19) in which an oxygen potential β of the oxidation promotion gas G2 was set to 10.0%, and Inventional Example (Experimental Example 2) in which the oxygen potential β of the oxidation promotion gas G2 was set to 15.0%.

As shown in FIG. 5, it has been checked that a conductive iron oxide slag can be formed on the surfaces of the weld bead and the weld toe portion by using an appropriate oxidation promotion gas G1, and a higher effect can be achieved by avoiding poor coating and increasing the oxygen potential β of the oxidation promotion gas G2.

Figure 6:
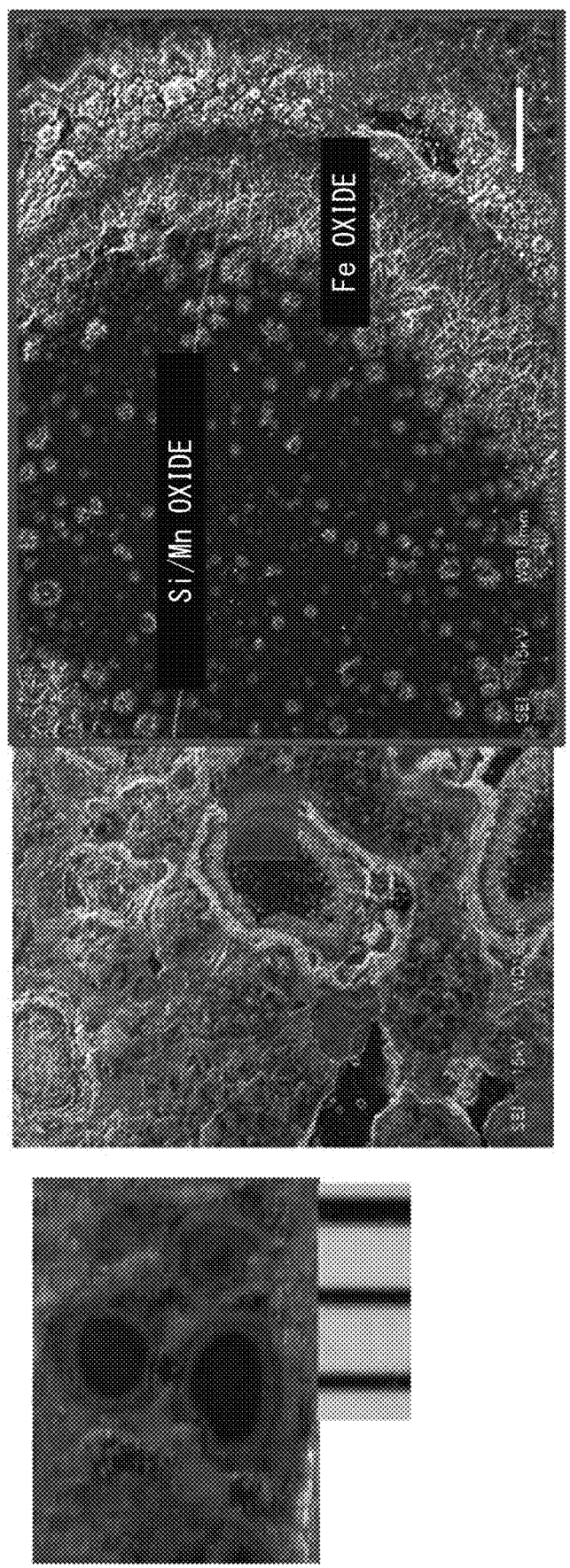
FIG. 6 are photographs of the external appearance (left) and an SEM photograph showing a state where a part of a Si/Mn-based slag is replaced with a Fe-based oxide in Comparative Example (Experimental Example 19) in which the oxygen potential β of the oxidation promotion gas G2 is set to 10.0%.

FIG. 6 are photographs of the external appearance (left) and an SEM photograph showing a state where a part of a Si/Mn-based slag is replaced with an Fe-based oxide in Comparative Example (Experimental Example 19) in which the oxygen potential β of the oxidation promotion gas G2 was set to 10.0%. As shown in FIG. 6, a Si oxide or a Mn oxide can be replaced with a Fe oxide by using the oxidation promotion gas G2. However, it is ascertained that in a case where the oxygen potential β of the oxidation promotion gas G2 is low, a Si oxide or a Mn oxide remains on the surface, thereby causing poor coating.

Moreover, in Comparative Example (Experimental Example 19) in which the oxygen potential β of the oxidation promotion gas G2 was set to 10.0%, and in Inventional Example (Experimental Example 2) in which the oxygen potential β of the oxidation promotion gas G2 was set to 15.0%, the weld bead after welding before electrodeposition coating was cut along a line perpendicular to the weld line, was embedded in a resin, and was polished. Thereafter, element mapping (Fe, C, O, Si, and Mn) was performed by means of the EPMA. As a result, in an observation of the Si/Mn-based slag in Comparative Example (Experimental Example 19), the Fe concentration generally ranged from 3% to 7%, which was low. In contrast, in an observation of the Fe-based oxide in Inventional Example (Experimental Example 2), the Fe concentration increased to a range from 40% to 70%, and it could be checked that the thickness was 30 μm, which was thick. In regard to the surface of the weld bead in Comparative Example (Experimental Example 19), it could also be checked that an iron oxide film was formed on the bead surface out of the range in which the Si/Mn-based slag was generated, but the thickness was approximately 5 μm, which was thin, and the generation form differed from that of the iron oxide in Inventional Example (Experimental Example 2).

Figure 7:
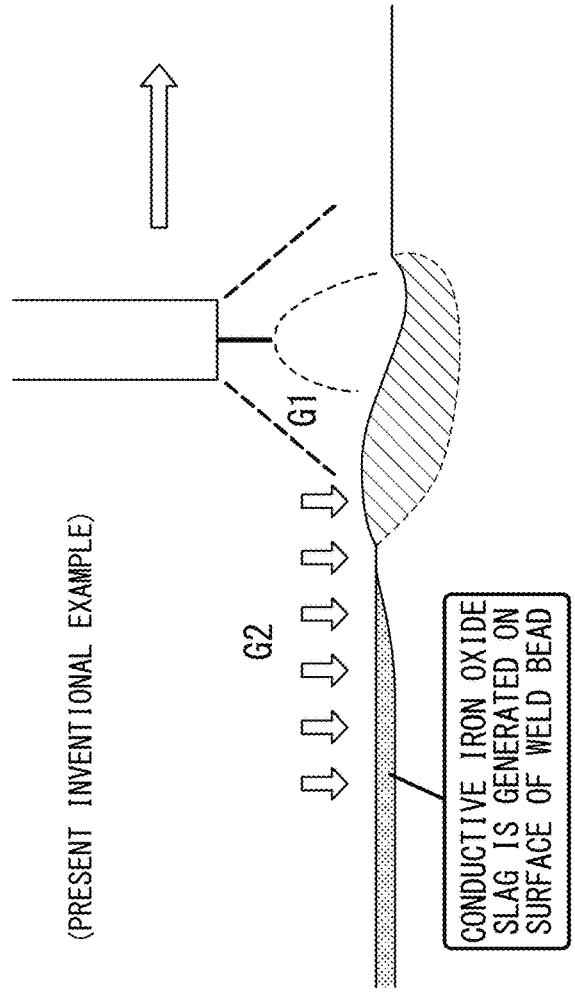
FIG. 7 is a schematic view showing an effect in Inventional Example in comparison with the technologies of Patent Documents 1 to 3.
Figure 8:
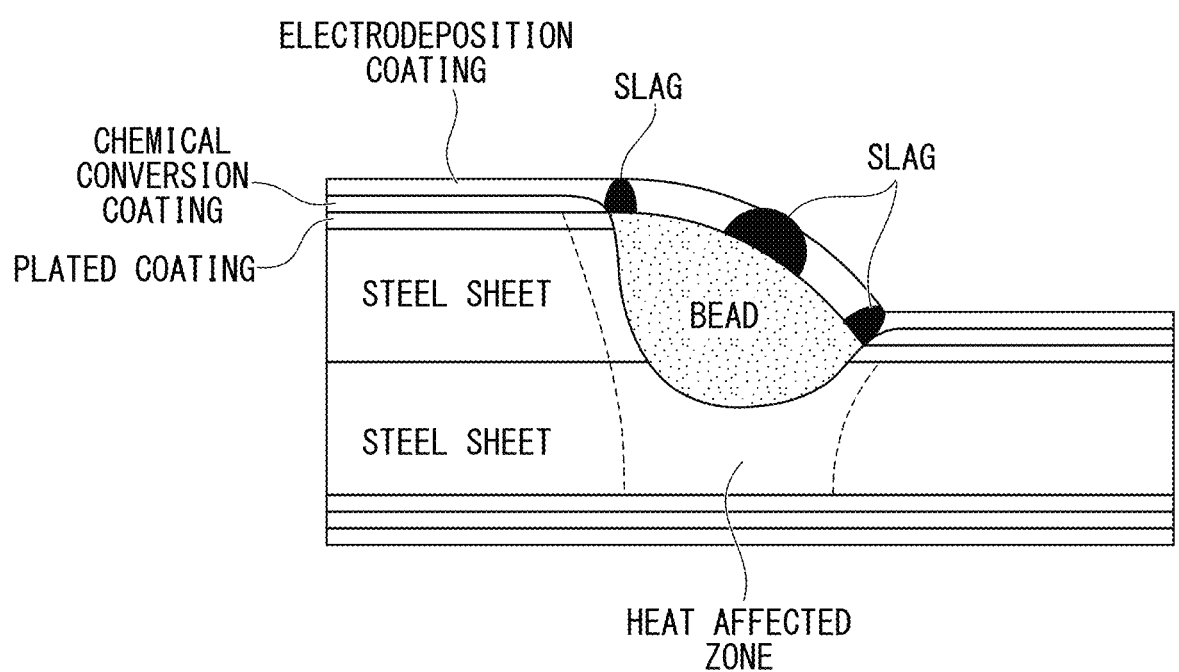
FIG. 8 is a cross-sectional view perpendicular to a steel sheet and is a view showing a structure of a welding portion realized through a welding method in the related art.

FIG. 7 is a schematic view showing an effect in Inventional Example in comparison with the technologies of Patent Documents 1 to 3. As shown in the drawing, as in the technologies of Patent Documents 1 to 3, in gas shield arc welding in which no oxidation promotion gas G2 is blown, the weld bead and the weld toe portion in a high temperature state come into contact with the shielding gas G1. Therefore, the surfaces of the weld bead and the weld toe portion cannot be covered with a conductive iron oxide slag.

Meanwhile, according to the present Inventional Example, the oxidation promotion gas G2 is blown over the weld bead and the weld toe portion in a high temperature state of 700° C. or higher at the flow velocity of 1 m/sec or faster. Accordingly, the shielding gas G1 tends to flow to the top of the weld bead from the welding torch is eliminated. Therefore, the weld bead and the weld toe portion in a high temperature state are in a contact state with the oxidation promotion gas 2. Since the oxygen potential β of the oxidation promotion gas G2 is increased to 15% or higher, oxidation reaction on the surfaces of the weld bead and the weld toe portion is promoted, so that a conductive iron oxide slag can be sufficiently formed. Therefore, an effect of preventing poor coating can be achieved. Moreover, in a case where the oxidation promotion gas G2 is blown by using the hood nozzle, the after nozzle, or the co-axial nozzle, the oxidation promotion gas G2 can be focused on a desired location. Thus, the effect can be enhanced.

INDUSTRIAL APPLICABILITY

According to the present invention, it is possible to provide a welding portion in which no poor electrodeposition coating portion is generated due to the Si/Mn-based slag, and a consumable electrode type gas shield arc welding method able to form the welding portion.

BRIEF DESCRIPTION OF THE REFERENCE SYMBOLS

1 WELDING TORCH
5 CONSUMABLE ELECTRODE
6 ARC
8 MOLTEN POOL
81 WELD BEAD
82 WELD TOE PORTION
9 CONDUCTIVE IRON OXIDE SLAG
10 GAS LENS
11 WELD LINE
20, 20', 20" OXIDATION PROMOTION GAS BLOWING UNIT
21, 21', 21" OXIDATION PROMOTION GAS SUPPLY PORTION
22 OXIDATION PROMOTION GAS BLOWING NOZZLE
22A HOOD NOZZLE
22B AFTER NOZZLE
22C CO-AXIAL NOZZLE
20 TORCH INSERTION HOLE
G1 SHIELDING GAS
G2 OXIDATION PROMOTION GAS

What is claimed is:

1. A consumable electrode type gas shield arc welding method for performing arc welding of two steel sheets using a welding torch having a consumable electrode, the method comprising:

performing arc welding while a shielding gas having an oxygen potential α which is indicated by the following Expression (1) and ranges from 1.5% to 5% is supplied from the welding torch toward the consumable electrode; and blowing an oxidation promotion gas having an oxygen potential β which is indicated by the following Expression (2) and ranges from 15% to 50% at a flow velocity ranging from 1 to 3 m/sec over a weld bead and a weld toe portion which are formed by arc welding and are in a state of 700° C. or higher, $$\alpha = 100 \times ([V_1(O_2)] + [V_1(CO_2)]/5) / ([V_1(X)] + [V_1(O_2)] + [V_1(CO_2)]) \quad \text{Expression (A)}$$

$$\beta = 100 \times [V_2(O_2)] / ([V_2(X)] + [V_2(O_2)] + [V_2(CO_2)]) \quad \text{Expression (B)}$$

where, $[V_1(X)]$ is a mixing ratio (volume %) of an inert gas included in the shielding gas, $[V_1(O_2)]$ is a mixing ratio (volume %) of oxygen included in the shielding gas, $[V_1(CO_2)]$ is a mixing ratio (volume %) of carbon dioxide included in the shielding gas, $[V_2(X)]$ is a mixing ratio (volume %) of an inert gas included in the oxidation promotion gas, $[V_2(O_2)]$ is a mixing ratio (volume %) of oxygen included in the oxidation promotion gas, and $[V_2(CO_2)]$ is a mixing ratio (volume %) of carbon dioxide included in the oxidation promotion gas.

2. The consumable electrode type gas shield arc welding method according to claim 1,
wherein the oxidation promotion gas is blown via a space formed between the welding torch and an outer circumferential wall which is provided to be separated outward from an outer circumferential surface of the welding torch.

3. The consumable electrode type gas shield arc welding method according to claim 1,
wherein in a state where at least an upper region of a part of the weld bead or the weld toe portion in a state of 700° C. or higher is surrounded, the oxidation promotion gas is blown within the upper region.

4. The consumable electrode type gas shield arc welding method according to claim 1,
wherein a shortest separation distance in a horizontal direction between a portion over which the oxidation promotion gas is blown and a tip position of the consumable electrode in the weld bead and the weld toe portion is 35 mm or shorter.

5. The consumable electrode type gas shield arc welding method according to claim 2,
wherein in a state where at least an upper region of a part of the weld bead or the weld toe portion in a state of 700° C. or higher is surrounded, the oxidation promotion gas is blown within the upper region.

6. The consumable electrode type gas shield arc welding method according to claim 2,
wherein a shortest separation distance in a horizontal direction between a portion over which the oxidation promotion gas is blown and a tip position of the consumable electrode in the weld bead and the weld toe portion is 35 mm or shorter.

7. The consumable electrode type gas shield arc welding method according to claim 3,
wherein a shortest separation distance in a horizontal direction between a portion over which the oxidation promotion gas is blown and a tip position of the consumable electrode in the weld bead and the weld toe portion is 35 mm or shorter.

* * * * *